L. P. HALLADAY.
SHOCK ABSORBER.
APPLICATION FILED JAN. 3, 1916.
1,287,003.
Patented Dec. 10, 1918.
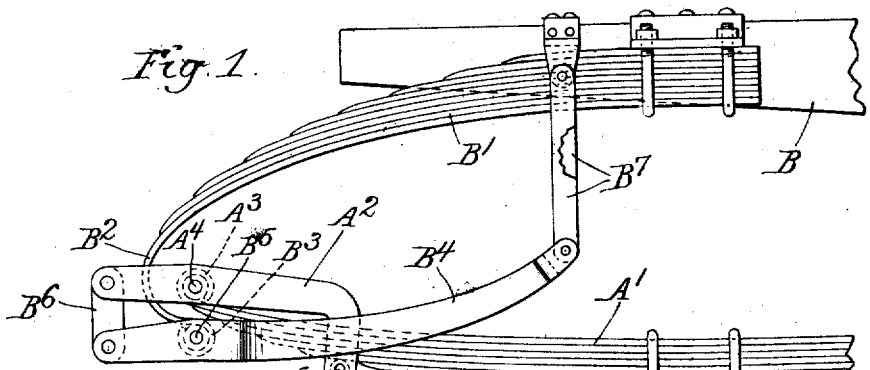
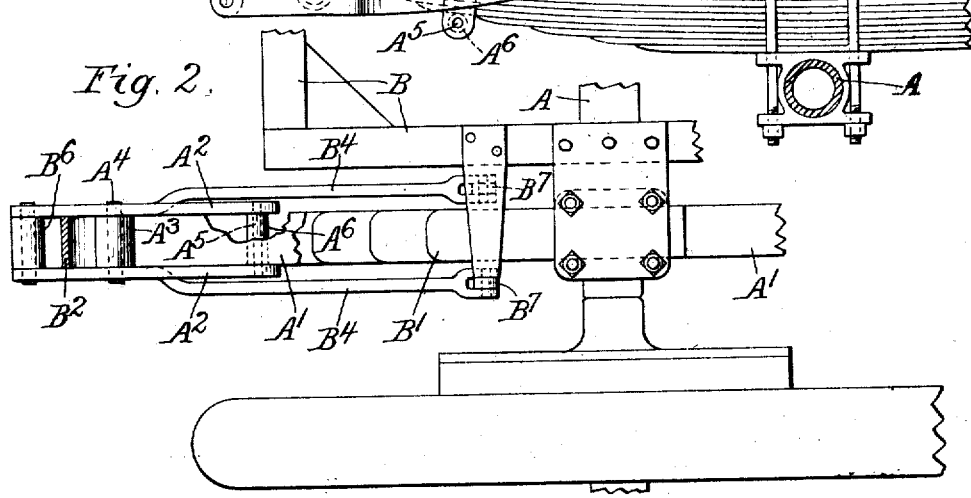
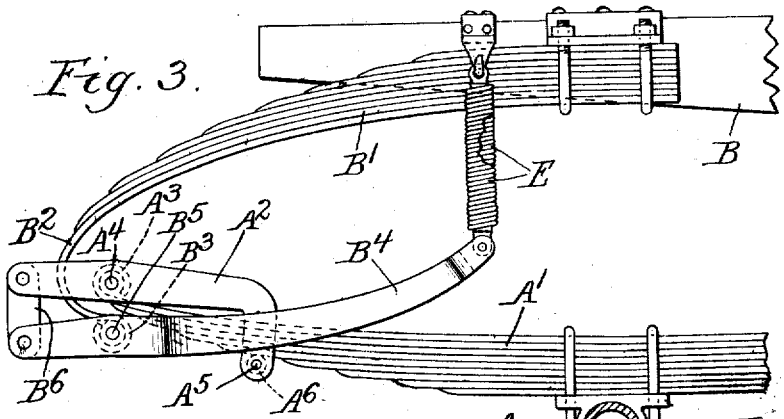
Witnesses.
Edward P. Wray
Minnie M. Lindeman
Inventor.
Lewis P. Halladay
by
Attorneys.

UNITED STATES PATENT OFFICE.

LEWIS P. HALLADAY, OF STREATOR, ILLINOIS.

SHOCK-ABSORBER.

1,287,003.

Specification of Letters Patent. Patented Dec. 10, 1918.

Application filed January 3, 1916. Serial No. 69,781.

*To all whom it may concern:*

Be it known that I, LEWIS P. HALLADAY, a citizen of the United States, residing at Streator, in the county of La Salle and State of Illinois, have invented a certain new and useful Improvement in Shock-Absorbers, of which the following is a specification.

My invention relates to improvements in spring suspension for motor vehicles and the like. It has for one object to provide new and improved suspension means whereby the spring action may be improved. Another object is to provide means for absorbing minor shocks and jars caused by the movement of the vehicle along road surfaces. Another object is to provide a shock absorbing mechanism which will, so far as its sensitiveness to road shock is concerned, be independent of the rigidity of the flat vehicle suspension spring. Another object is to provide a shock absorbing connection between the vehicle axle and the vehicle body, in series with the normal leaf spring suspension, which shock absorbing connection will be rigid in itself and have no springs therein. Another object is to provide such a rigid connection which will be controlled by the movement of the body.

My invention is illustrated more or less diagrammatically in the accompanying drawings, wherein Figure 1 is a diagrammatic side elevation showing my invention applied to an automobile;

Fig. 2 is a plan view of my invention; and

Fig. 3 is a modified form of my invention.

Like parts are indicated by like letters throughout the several figures.

A is a vehicle axle. Upon it rests the flat leaf spring $A^1$. $A^2$ $A^2$ are anchor levers. They are pivoted one on each side of the spring bolt eye $A^3$, being held in position by the spring bolt $A^4$. These levers are tied together at their inner end by the pin $A^5$ upon which is mounted a roller $A^6$, the roller being in movable engagement with the under surface of the spring $A^1$ so that the anchor levers are anchored on the spring and in effect form an extension thereof, the ultimate result being to substantially increase the effective length of the flat leaf spring.

B is the vehicle frame. $B^1$ is a spring rearwardly projecting therefrom downwardly toward the axle supported spring. It has the downwardly and forwardly curved scroll end $B^2$, arranged so as to bring the spring bolt eye $B^3$ substantially under the eye $A^3$. $B^4$ $B^4$ are supporting levers pivoted on the pin $B^5$, which pin is supported in the eye $B^3$. These levers engage each the opposed end of the spring eye $B^3$ and extend rearwardly beneath the levers $A^2$. $B^6$ is a tension link providing a flexible pivot connection between the levers $A^2$ and $B^4$ as shown. The levers $B^4$ are bent slightly outwardly as they extend forward, to permit clearance between their inner sides and the anchor levers $A^2$. They are supported at their inner ends by the links $B^7$, from the vehicle frame or body B.

In the modified form a spring E is substituted for the rigid pivoted links $B^7$.

It will be evident that while I have shown in my drawings an operative device, still many changes might be made both in size, shape and arrangement of parts, without departing from the spirit of my invention, and I wish therefore that my drawings be regarded as in a sense diagrammatic.

The use and operation of my invention is as follows:

The long supporting levers are movably or flexibly suspended at their inner ends by the links as shown, which links are supported from the vehicle frame or body. It will be understood that the weight of the body is supported through these links from the outer ends of the anchor levers, which anchor levers in effect amount to a lengthening of the lower axle supported spring. The weight of the body is applied to these levers at a point intermediate their ends, but adjacent the end to which they are pivotally supported from the anchor levers.

When the load on the vehicle is increased, the increased weight tends to compress both of the flat springs and does compress them to a certain extent. This load also tends to separate the two spring eyes, but unless the supporting lever rotates such separation cannot take place because every compression however slight of the counter-elliptic spring on the body, permits the body to drop down and since the supporting lever is supported from the body, this lever will rotate about its pivot point and permit a separation between the ends of the flat leaf springs.

In the form shown, the lever advantage is approximately 5 to 1 so that if the body itself drops down 5 inches, the two spring ends will separate about 1 inch. This takes place altogether independent of the flexure of the lower half-elliptic spring, because flexure of the lower spring only results in lowering the pivot point upon which the supporting levers are fulcrumed. The result is that the counter-elliptic portion of the spring is relied upon to permit the initial drop, which renders the operation of the shock absorbing mechanism effective, that is to say, the instant the counter-elliptic spring commences to flex the body drops down a certain distance, but as it drops it permits the end of the counter-elliptic spring to also move downward, thus amplifying in effect the ultimate result of the movement of that spring. Thus the movement of the body itself controls the operation of the shock absorber. If the body did not move down at all, the shock absorber would have no movement and the effective movement of the shock absorber, for that is what this lever system is, is controlled in so far as its excursion is concerned, by the movement of the body itself, which movement is in turn affected by the shock absorber.

In the modified form as shown, the coil spring indicated is used in order to permit a certain movement of the shock absorber levers independent of the operation of the counter-elliptic spring. In this case as the counter-elliptic spring may be regarded as rigid, the increased downward pressure of the body will be absorbed by the flexion of the coil spring which will cause the supporting levers to rotate thus dropping the forward end of the supporting lever through a certain distance bearing in the preferred form a 5 to 1 ratio through a distance where the body load is applied to the lever drops. If the counter-elliptic spring be regarded still as a flexible effective spring, then the movement of the supporting lever at its forward end will be the sum of the movement permitted by the flat spring, plus the movement or extension of the coil spring. Under ordinary circumstances, however, the coil spring is not necessary and I find that with the link connection the desired shock absorbing result is obtained.

The levers and connecting parts are firmly and closely held in position by the supporting tie bolts and lying on either side of the springs as they do, they steady the spring connection and effectually prevent all side sway in so far as the connection between the counter-elliptic and half-elliptic spring sections are concerned.

It will be noted that the two levers, the rocking lever and the anchor lever are pivotally connected by a link, although of course it is obvious that this link might be as long or as short as may be, and that its sole function is to properly space and distribute the parts so as to make them dovetail in and take their proper position in relation to the normal spring suspension, and of course the term "pivoted" as applied to the lever or the statement that one part is pivoted on the other, may or may not as the case may be, include the intermediate lever.

I claim—

1. A spring suspension for vehicles and the like comprising a rigidly leaf spring attached to the vehicle body, a lever, a fulcrum therefor, a pivot connection between the lever and the leaf spring intermediate the ends of the lever, and a connection between an end of the lever and the vehicle body.

2. A spring suspension for vehicles and the like comprising a rigidly leaf spring attached to the vehicle body, a lever, a fulcrum therefor, a pivot connection between the lever and the leaf spring intermediate the ends of the lever, and a spring connection between an end of the lever and the vehicle body.

3. A spring suspension for road vehicles and the like comprising a leaf spring, a lever held by and projecting outwardly from such spring, and a rocking lever fulcrumed on the end of such spring supported lever.

4. A spring suspension for road vehicles and the like comprising a leaf spring, a lever held by and projecting outwardly from such spring, a rocking lever fulcrumed on the end of such spring supported lever, and a connection between the free end of the rocking lever and the vehicle body.

5. A spring suspension for road vehicles and the like comprising a leaf spring, a lever held by and projecting outwardly from such spring, a rocking lever fulcrumed on the end of such spring supported lever, a spring securely attached to the vehicle body and in pivotal relation with the lever, and a connection between the free end of the rocking lever and the vehicle body.

6. A spring suspension for road vehicles and the like comprising a leaf spring, a lever held by and projecting outwardly from such spring, a rocking lever fulcrumed on the end of such spring supported lever, a spring securely attached to the vehicle body and in pivotal relation with the lever, and a spring connection between the end of the lever and the vehicle body.

7. The combination with a three-quarter elliptic spring for road vehicles and the like of a lever pivoted on the half elliptic spring member and extending beyond the end thereof, a connection between one end of the lever and the spring to prevent rotation of the lever about the spring end, a rocking lever fulcrumed on the end of such spring supported lever, the quarter elliptic spring member being pivotally connected to such rocking lever adjacent its fulcrum, and a connection between the end of such lever and the vehicle.

8. The combination with a three-quarter elliptic spring for road vehicles and the like of a lever pivoted on the half elliptic spring member and extending beyond the end thereof, a connection between one end of the lever and the spring to prevent rotation of the lever about the spring end, a rocking lever fulcrumed on the end of such spring supported lever, the quarter elliptic spring member being pivotally connected to such supporting lever adjacent its fulcrum, and a spring connection between the end of such lever and the vehicle body.

9. A motor vehicle comprising an axle, a flat leaf spring resting thereupon, a vehicle body, a flat leaf spring anchored thereon, an anchor lever pivoted on the end of the axle supported spring, one end of said lever being adapted to engage said spring, the other end being extended beyond the end of the spring, a rocking lever having its end fulcrumed on the anchor lever, a pivot connection between the end of the spring anchored on the body and the rocking lever and a connection between the free end of the rocking lever and the vehicle body.

10. A road vehicle comprising an axle, a flat leaf spring carried thereby, an anchor lever pivoted on the end of the spring anchored at one end slidably on the spring and having its other end projecting beyond the end of the spring, a rocking lever having one end fulcrumed on the end of the anchor lever and extending toward the central portion of the spring, a vehicle body having a leaf spring projecting therefrom, its end being in pivotal engagement with said rocking lever, and a connection between the free end of said lever and the vehicle body.

11. A spring suspension for road vehicles and the like, comprising an axle supported leaf spring, a lever free to rock and pivotally supported from the end of such spring, a leaf spring projecting from the vehicle body and attached to the lever intermediate its ends and a connection between the free end of the lever and the vehicle body.

12. A suspension system for road vehicles and the like comprising a vehicle axle, a part supported thereon, an extension therefrom, a lever fulcrumed on such extension, a connection between the lever and the vehicle body, and an additional connection between the end of the lever and the vehicle body.

13. A suspension system for road vehicles and the like comprising a vehicle axle, a part supported thereon, an extension therefrom a lever fulcrumed on such extension, a connection between the lever and the vehicle body, and an additional connection between the end of the lever and the vehicle body, one of said connections comprising a spring adapted to be compressed as the load increases, and the other a spring adapted to be extended as the load increases.

14. A suspension system for road vehicles and the like comprising a vehicle axle, a part supported thereon, a member extending therefrom, a lever fulcrumed on such extended member, a connection between the lever and the vehicle body, and an additional connection between the end of the lever and the vehicle body, one of said connections comprising a spring adapted to be compressed as the load increases.

In testimony whereof, I affix my signature in the presence of two witnesses this 23rd day of December 1915.

LEWIS P. HALLADAY.

Witnesses:
CHARLES H. WILLIAMS,
M. COULSON.